United States Patent Office 3,010,889
Patented Nov. 28, 1961

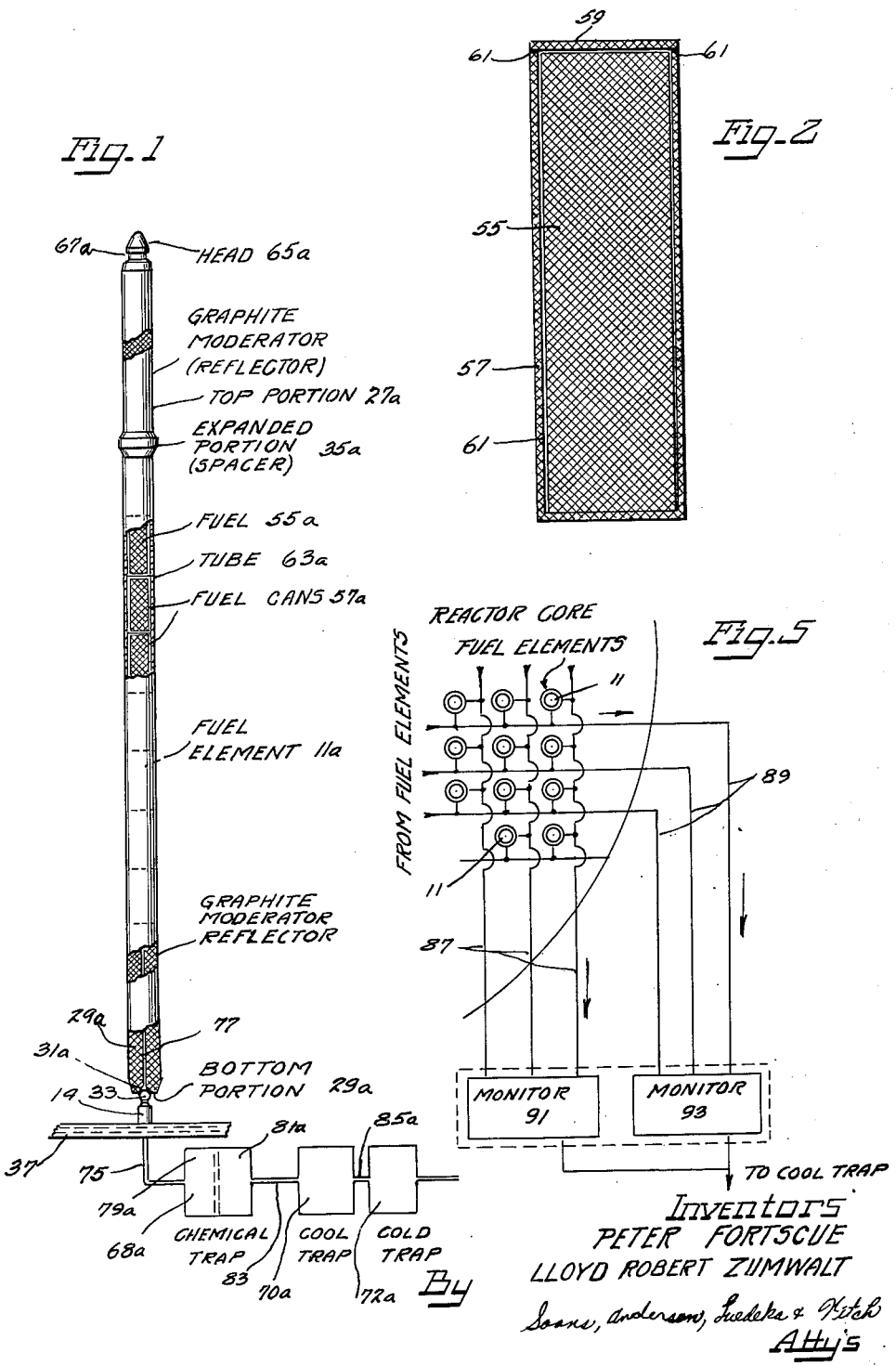

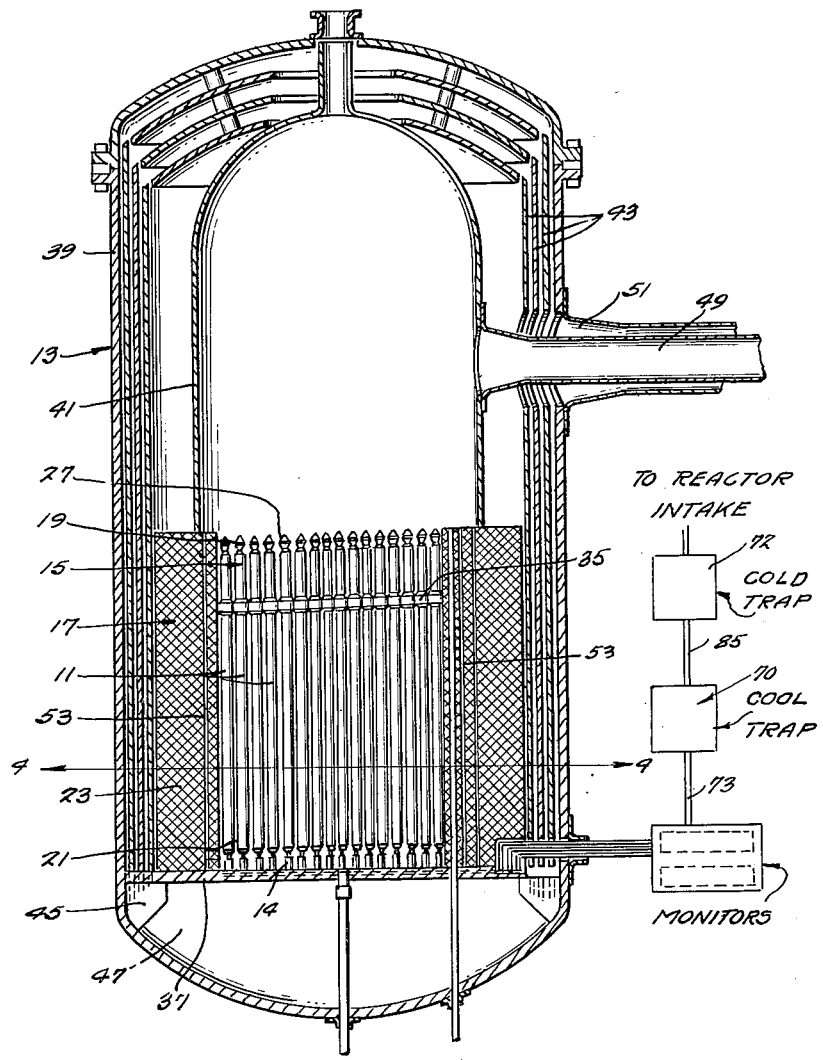

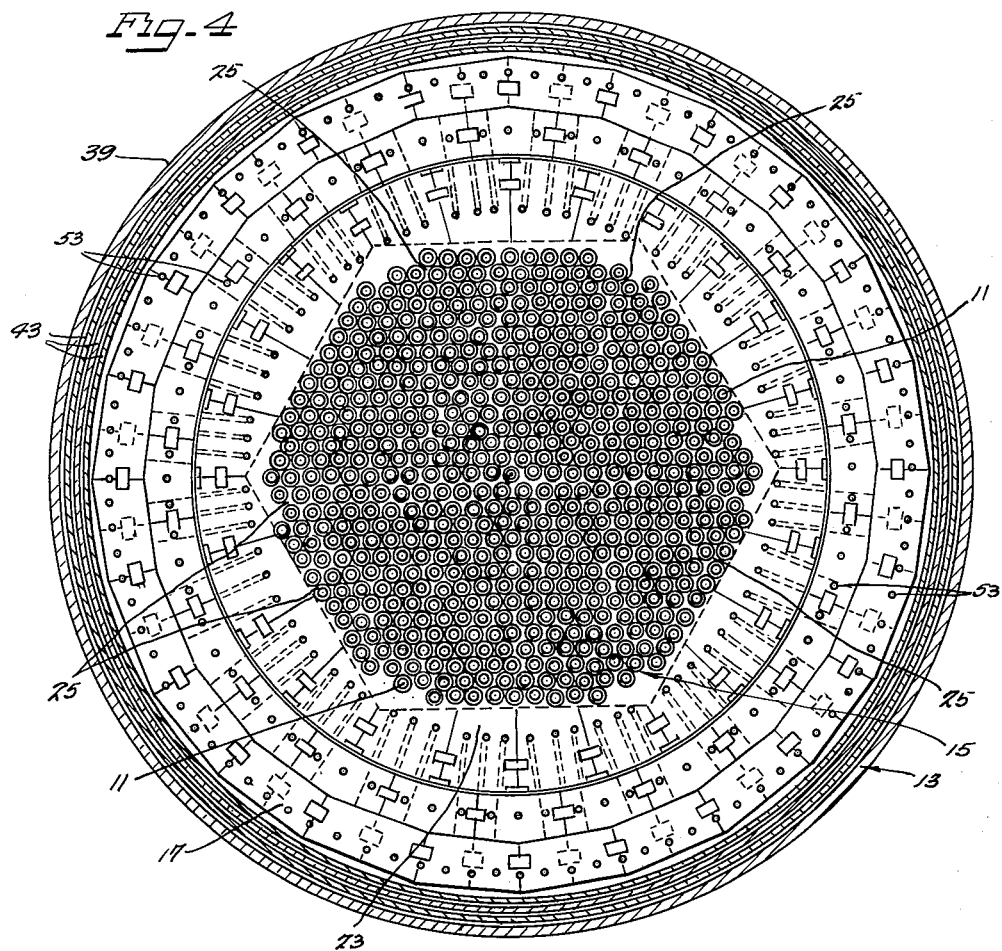
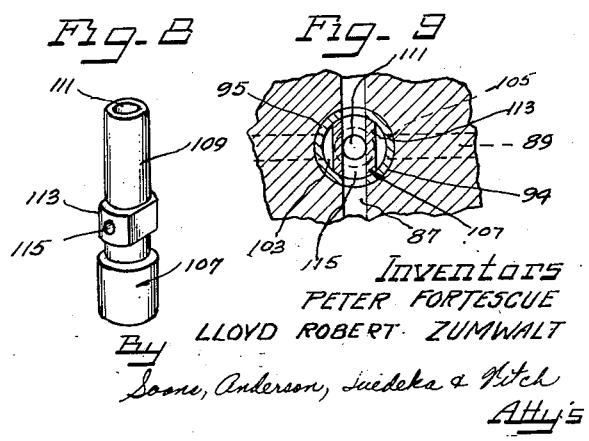

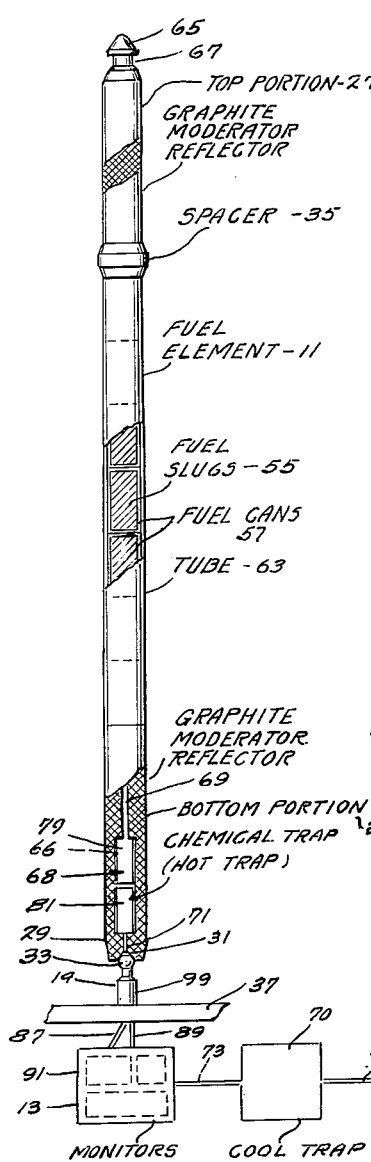

3,010,889
FUEL ELEMENT
Peter Fortescue and Lloyd Robert Zumwalt, La Jolla, Calif., assignors, by mesne assignments, to the United States of America as represented by the United States Atomic Energy Commission
Filed Aug. 8, 1958, Ser. No. 753,950
10 Claims. (Cl. 204—193.2)

The present invention generally relates to fuel elements for neutronic reactors and more particularly relates to fuel elements for high temperature, gas cooled neutronic reactors, which fuel elements include means for attenuating the migration of fission products therefrom.

In the generation of power by neutronic reactors operating by the well-known fission process, economy is a prime consideration as it is with other types of power generators. In this connection, it is, of course, important to obtain as high a degree of efficiency as possible in the transfer of heat from the reactor core fuel to the cooling medium. It is also of advantage to be able to provide a high-power density so as to be able to generate a large amount of heat in a relatively small core under controlled conditions.

Gas cooled neutronic reactors offer the possibility of increasing the thermal efficiency of heat transfer from the reactor core since their coolants do not limit their temperature of operation, as is the case with liquid cooled systems. At higher operating temperatures of which gas cooled neutronic reactors are theoretically capable, the thermal efficiency in transferring heat from the reactor core to the coolant is considerably increased.

Various types of gas cooled neutronic reactors have been utilized heretofore for the generation of power and for other purposes. Examples of typical gas cooled neutronic reactors are as set forth in U.S. Patent No. 2,827,429 to Binner et al., U.S. Patent No. 2,831,807 to McGarry, U.S. Patent No. 2,799,642 to Hurwitz, Jr., et al., U.S. Patent No. 2,782,158 to Wheeler and U.S. Patent No. 2,714,577 to Fermi et al., as well as British Patents Nos. 779,134 (issued July 17, 1957) and 789,022 (issued January 15, 1958).

It is the principal object of the present invention to provide an improved fuel element for gas cooled neutronic reactors. It is a further object of the present invention to provide an improved, solid fuel element for high temperature, gas cooled neutronic reactors. Another object of the present invention is to provide a solid fuel element, a plurality of which elements are capable of operating efficiently as a neutronic reactor core at high temperatures to provide high power density and a high degree of efficiency of heat transfer therefrom to a coolant. It is also the object of the present invention to provide a fuel element for a neutronic reactor, which element employs a novel and efficient system for the retention and attenuation of fission products arising during operation of the fuel element in a neutronic reactor core. It is a further object of the present invention to provide an improved, economical, inexpensive fuel element for high temperature gas cooled neutronic reactors, a plurality of which elements can be utilized to form a reactor core capable of operating efficiently and economically for power generation without auxiliary equipment to preserve temperatures during such power generation. It is another object of the present invention to provide an improved, solid high temperature fuel element which has stabilized heat distribution and improved safety against rupture. It is a further object of the present invention to provide an efficient radiation monitor system for the fuel elements of the present invention, which monitor system is capable of accurately locating the source of fluctuations in radiation level in a reactor core.

Further objects and advantages of the present invention will be apparent from a study of the following detailed description and of the accompanying drawings of which:

FIGURE 1 is a schematic side elevation illustrating certain features of one embodiment of a fuel element in accordance with the present invention, portions being broken away to show the interior construction of the fuel element.

FIGURE 2 is a schematic enlarged sectional view of one of the fuel cans shown in FIGURE 1;

FIGURE 3 is a schematic vertical section of a gas cooled neutronic reactor incorporating fuel elements embodying various of the features of the present invention, portions of the reactor being shown in elevation;

FIGURE 4 is a schematic sectional view taken along the section line 4—4 of FIGURE 3;

FIGURE 5 is a schematic representation of a radiation monitor system for the fuel elements of the reactor;

FIGURE 6 is a schematic side elevation illustrating certain features of a preferred embodiment of a fuel element in accordance with the present invention, portions being broken away to show the internal construction, the fuel element incorporating a fission trap system;

FIGURE 7 is a schematic enlarged side elevation partly in section, illustrating a plurality of fuel element support means interconnected with a radiation monitor system;

FIGURE 8 is an enlarged fragmentary schematic side elevation of a component illustrated in FIGURE 7 for interconnecting the fuel element support means with the radiation monitor system; and FIGURE 9 is an enlarged sectional view taken along the section line 9—9 of FIGURE 7.

We have found that fuel elements can be provided in accordance with the present invention, which fuel elements are capable of functioning satisfactorily in a compact gas cooled neutronic reactor core over an extended period of time at high temperatures greatly in excess of 800° F. to provide a reactor system with greatly increased thermal efficiency, of up to about 40 percent or more, and with increased power density. It should be understood that the fuel elements of the present invention can be readily substituted in conventional gas cooled neutronic reactors for fuel elements heretofore utilized therein.

The fuel element of the present invention has a substantial proportion of the moderator in intimate admixture with the fuel, in contrast to the usual heterogeneous or substantially heterogeneous fuel elements of conventional gas cooled neutronic reactors. With this arrangement, a substantial increase in the total surface area of each fuel element is provided, while maintaining substantially the same core volume. Such surface increase has been found to greatly facilitate cooling of the core, that is, greatly increases the thermal efficiency of the reactor.

The fuel element of the invention also does not require the usual metallic jacket and fins or other extended surfaces, as are found in solid heterogeneous fuel elements, and is capable of operating at higher temperatures, substantially in excess of 1800° F. with improved neutron economy and thermal efficiency.

However, elimination of the metallic can presents a problem of containment (retention and/or attenuation) of radioactive volatile fission products arising during the high temperature operations. Such a problem, however, would be present to some extent in any high temperature operation, since any conventional metallic or non-metallic canning materials which might be selected would be somewhat porous to fission products at high temperatures. We have found that this problem can be overcome, in part, through the use, in accordance with the present invention, of graphite or other moderator as a jacket or can around the fuel, which moderator is pretreated so as to have a high degree of resistance to the passage of fission products therethrough.

Each fuel element comprises a container which is divided up into a number of separate compartments, each compartment comprising a fuel can constructed of the impervious graphite or other moderator and containing a fuel slug, as hereinafter set forth in greater detail. With such an arrangement, the necessary amount of impervious graphite or other moderator can be limited to the described fuel cans, thereby effecting a cost saving, that is, the walls of the outer container of the fuel element can be constructed of the less expensive untreated graphite or other suitable moderator.

Moreover, the arrangement of a number of separate cans of fuel within each fuel element has the advantage of minimizing the drift of fission product poisons within the fuel elements. Such drift from the hotter to the cooler ends of each fuel element occurs in substantially all solid fuel elements. Where the fuel mass of each fuel element is large or elongated, the drift of fission product poisons may be considerable over an extended period of time and may upset the internal heat distribution in the fuel element, leading to its malfunctioning. However, by providing a plurality of small masses of fuel distributed throughout each fuel element, the masses being separated from one another by the moderator jackets, or cans, migration or drift or fission products occurs simultaneously in the plurality of fuel masses throughout the length of the fuel element and the internal heat distribution throughout the fuel element is substantially maintained.

Furthermore, when the described plurality of separately contained fuel masses are utilized in each fuel element, rupture of either the outer container of the fuel element or any of the fuel cans is not as serious as rupture of a conventional fuel element, which latter rupture exposes all or a great portion of the fuel instead of a small part thereof.

In addition to the plurality of fuel cans for each fuel element, a fission product trap system is provided which greatly attenuates the flow of fission products from the fuel elements. A novel radiation monitor system is also preferably provided, whereby a constant check on the condition of the reactor core and the individual fuel elements can be made.

The fuel cans are loosely disposed within each fuel element and the space between the fuel cans and outer tube of each fuel element is connected to a fission product trap system employing a chemical trap preferably disposed within the fuel element proper and additional traps, chemical and/or physical, external of the fuel element proper. Accordingly, a two stage attenuation of fission products is provided, that is, (1), the plurality of cans highly resistant to passage of volatile radiation fission products, and (2), the fission product trap system connected to the space between the fuel cans and outer container of each fuel element, that is, not in direct communication with either the fuel or the environment external of the fuel elements. Highly efficient trapping of volatile fission products is achieved thereby. Such arrangement need not completely prevent any fission products whatever from passing from the fuel and reactor core into the rest of the reactor system. Instead, it is sufficient that the arrangement remove a large portion of the fission products from circulation and attenuate or slow down the passage of the remainder of the fission products so that a build-up of the fission products in the primary coolant circuit (within and outside of the core) to an extent which would damage the reactor or prevent its use in a safe manner over an extended period of time is prevented.

Preferably, the fission product trap system is vented from the space between the outer container and internal cans of each fuel element to a point in the primary coolant circuit where the pressure is at least slightly lower than that in the coolant passages between the fuel elements. This arrangement assures that any transfer of coolant through the walls of the outer tube of each fuel element is inwardly from the higher pressure zone outside of the fuel element to such lower pressure zone connected to the fuel element. Accordingly, volatile fission products do not leak outwardly through the outer tube of the fuel element. A preferred point for such venting is one along the outlet pathway for the gaseous coolant from the reactor core.

Referring now more particularly to FIGURES 1 and 6 of the accompanying drawings, two embodiments of the fuel element of the present invention are illustrated. The fuel element 11 of FIGURE 6 has a chemical trap disposed within the body of the fuel element, while in FIGURE 1, the fuel element 11a is shown without such internally disposed chemical trap. The fuel element 11 of FIGURE 6 is the preferred embodiment. A plurality of the fuel elements 11 are also shown in FIGURE 3, uniformly spaced and generally vertically disposed in the conventional manner within a typical gas cooled neutronic reactor 13. The relative heights of the individual fuel elements as positioned within the core have been exaggerated to clearly illustrate variations in the length of supporting means or stems 14 for the fuel elements as hereinafter more fully described. The plurality of fuel elements are positioned within and comprise the reactor core 15, which is generally in the form of a right cylinder and which is surrounded on all sides thereof by a reflector 17 of neutron moderating material, such as graphite, which may be constructed, as indicated in FIGURE 4 of the accompanying drawings, of a plurality of blocks. The reflector is comprised of a top reflector 19 immediately above the active portion of the fuel elements, a bottom reflector 21 below the fuel elements and a side reflector 23 around the periphery of the bundle or mass of fuel elements forming the core.

The fuel elements, as illustrated particularly in FIGURE 4, are generally circular in cross section and are uniformly spaced apart within the core in a geometrical pattern, which is also generally circular in cross section. Desirably, the spacing pattern for the fuel elements may be in the form of equilateral triangles, as shown in FIGURE 4, with a fuel element being positioned at each end of each triangle. In any event, the fuel elements are arranged so that spaces 25 are provided therebetween, as shown in FIGURE 4, to permit the ready passage therethrough of the gaseous coolant. The gaseous coolant is a stable, non-corrosive and non-reactive medium, such as helium or other inert gas. The upper portion 27 of each of the fuel elements, particularly illustrated in FIGURES 3 and 6, is disposed within and may comprise a portion of the top reflector 19 of the reactor. The bottom portion 29 of each fuel element is disposed within and may comprise a portion of the bottom reflector 21 of the reactor. The bottom of each fuel element preferably has a cavity 31, centrally disposed therein, as shown particularly in FIGURE 7, and adapted to receive the top portion or head 33 of each fuel element support means 14. The support means are generally vertically extending and, when the respective fuel elements are seated therein, aid in maintaining the respective fuel elements in proper alignment within the reactor core.

Moreover, as shown more particularly in FIGURES 3 and 6, each fuel element is provided adjacent its upper end with a spacing means 35 which serves to maintain the fuel element properly spaced laterally from the adjoining fuel elements. That is, the spacing means 35 are provided so that the respective adjoining fuel elements touch each other preferably only at the locus of the spacer means. The non-abutting adjacent portions of the respective fuel elements form the walls for the spaces or passageways 25 through which the gas coolant for the reactor core flows.

The bottom reflector with the associated fuel element support means 14 may be disposed on a horizontally extending plate 37 rigidly connected to a generally vertically extending closed outer reactor shell or pressure vessel 39 which encloses the reactor and seals it from its auxiliary equipment. A dome shaped plenum shroud 41 as illustrated in FIGURE 3, may, in turn, be disposed above the reactor core, with the lower ends thereof secured to the upper surface of the reflector. A plurality of spaced apart thermal shields 43 are disposed around and spaced from the sides of the reflector and over the reactor core, lateral of the plenum shroud 41 and within the pressure vessel 39. The lower ends of the thermal shield terminate below the plate 37 in supporting abutments 45 as shown in FIGURE 3. Since the plate 37 is spaced from the bottom of the vessel 39 a lower plenum chamber 47 is provided.

As shown in FIGURE 3, an inlet tube 49 and an outlet tube 51 provide access to and from the reactor vessel for the cooling medium which circulates through a primary circuit between the reactor vessel 39, steam generators (not shown) and main circulators (not shown). Within the reactor vessel, the coolant circulates through the reactor core, the reflector, plenum shroud and thermal shields, suitable passageways being provided therein, such passageways being generally designated 53 in FIGURES 3 and 4 of the accompanying drawings.

As illustrated in FIGURE 3, passageways may also be provided for the collection of fission products from the respective fuel elements and for their passage to appropriate fission product retention traps and radiation monitors, all or some of which may be located outside of the reactor vessel 39. The traps and monitors are more fully described hereinafter.

Now referring more particularly to FIGURES 6 and 2 of the accompanying drawings, the fuel element 11 is shown, with portions broken away to display its internal construction. The fuel element 11 comprises, in part, a plurality of fuel compacts or slugs 55, the slugs being of any suitable size and shape commensurate with the requirements of the reactor core design. Each of the fuel slugs is loosely disposed within a can 57 of neutron moderating material, preferably graphite, which has been treated to provide a very low permeability to fission products.

Each fuel slug 55 may comprise a self-supporting substantially homogeneous admixture of fuel and moderator, that is, material readily fissionable by neutrons of thermal energy and neutron moderating material (moderator) tightly compacted together. The fuel and moderator are both preferably in particulate form, at least before compacting. The fuel comprises an intimate mixture of a small amount of uranium-235, together with a larger amount of either uranium-238 or thorium-232. These constituents may be present in the form of carbides, oxides or other suitable compounds.

When a mixture of uranium-235 and uranium-238 is utilized as the fuel in the reactor core, in accordance with the present invention, plutonium-239 ultimately results through neutron capture by the uranium-238. The fuel life is thereby extended, since fissions of the formed plutonium occur.

Fueling the reactor core with uranium-235 and thorium-232 mixtures provides similar results. In this instance, uranium-233 ultimately is formed from neutron capture in thorium-232. Fissions of the formed uranium-233 thereby considerably extend the fuel life. If desired, plutonium-239 and uranium-233 can be recovered as by-products from the respective irradiated fuels.

From nuclear considerations, the mixture of uranium-235 and thorium-232 has advantages over the described mixture of uranium-235 and uranium-238, principally in that it provides a significantly increased effective fuel life over the uranium-235—uranium-238 mixture. Moreover, plutonium may build up in the latter system, over an extended period of time, to a concentration sufficient to provide a definite positive contribution to the prompt temperature coefficient of the reactor because of increased neutron absorption in the 0.3 plutonium-239 resonance with increased temperature. This positive contribution, if large enough, may be undesirable as tending to adversely affect the stability of the reactor system.

The relative proportions of fuel constituents and the amounts of such constituents within each fuel element slug and within the core of each reactor will vary, depending upon the parameters of the reactor. Generally speaking, however, the uranium-235 material is present in a much smaller amount than the thorium-232 or uranium-238. At any rate, the amount of the fuel constituents in the assembled fuel elements disposed within the reactor core should, of course, be sufficient, considering the parameters of the reactor, to initiate and to sustain the desired fission chain reaction.

The following Table I sets forth a summary of characteristics of a specific 60 megawatt power reactor of the gas-cooled, high temperature type employing the fuel elements of the present invention:

TABLE I

(A) Operating conditions

| | |
|---|---|
| Coolant | Helium. |
| Coolant voidage space | 12.8%. |
| Coolant pressure | 15 atm. |
| Pumping (percent of heat out) (reactor +ducting+boiler) | 2%. |
| Inlet temperature | 665° F. |
| Outlet temperature | 1380° F. |
| Maximum graphite temperature (approx.) | 1850° F. |
| Over-all thermal efficiency | 36%. |
| Net electrical output | 21.5 mw. |
| Generated steam pressure | 1450 p.s.i.g. |
| Generated steam temperature | 1000° F. |

(B) Core proportions

| | |
|---|---|
| Initial $U^{235}$ material inventory | 65 kg. |
| Initial $Th^{232}$ inventory | 350 kg. |
| Core frontal area | 28.7 ft.$^2$. |
| Core diameter | 6.0 ft. |
| Active core length | 4.5 ft. |
| Coolant voidage | 12.8%. |
| Fuel element length | 9.5 ft. |
| Fuel element diameter | 3.0 in. |
| Number of fuel element positions | 517. |
| Number of control rods | 23. |
| Top reflector thickness | 2½ ft. |
| Bottom reflector thickness | 2½ ft. |
| Side reflector thickness | 2 ft. 5½ in. |
| Core graphite weight | 5,320 kg. |
| Reflector graphite weight | 31,900 kg. |
| Total graphite weight | 37,200 kg. |
| Pressure-vessel diameter (inside) | 11 ft. 11 in. |
| Pressure-vessel height | 27 ft. |
| Wall thickness | 1.5 in. |

(C) Derived quantities

| | |
|---|---|
| Power density (core) | 16.5 kw./liter. |
| Power density (on total pressure vessel volume) | 0.9 kw./liter. |
| Core graphite/uranium ratio | 1690. |
| Rating, mw./kg. of $U^{235}$ (heat) | 0.92. |
| Fissions per original fissile atom | 0.34. |

Burn-up (mw.-days (heat) per 1000 kg. of (U+Th)_____ 50,000.
Atomic fraction of whole fuel element_____ 0.02%.
Core life (years at 80% load factor)____ 1.2.
Initial conversion ratio_____ 0.5.
Mass of $U^{235}$ consumed_____ 26.5 kg.
Final mass of $U^{235}$_____ 38.5 kg.
Final mass of $U^{233}$_____ 10.5 kg.

From the foregoing, it is apparent that the initial amount of uranium-235 in relation to the initial amount of thorium-232 in the core may be relatively small, for example, approximately 18–20% by weight, and that the total amount of fuel required for sustained high temperature operation is also relatively small. This also is true with a uranium-235—uranium-238 reactor core.

The size of each fuel slug containing the fissionable mixture compacted with moderator is preferably kept small so that a considerable number of the canned slugs may be disposed within each fuel element. Thus, minimization of drift of fission products and of deleterious effects in the event of can rupture can thereby be effected. Furthermore, the cans of moderator, highly resistant to passage of volatile fission products, can also be kept small and more economical to manufacture and to utilize, i.e., less danger of rupture. Preferably each fuel element has at least about five and up to about ten canned slugs or more.

As an example, in the reactor core specified in Table I, each fuel element contains a total amount of approximately 704 grams of thorium-232 and 131 grams of uranium-235, both the thorium and uranium being present as carbides. Accordingly, if there are, for example, seven separate fuel slugs containing the uranium-235 and thorium-232 present within each fuel element in the reactor core, there will be about 19 grams of uranium-235 and about 101 grams of thorium-232 present per fuel slug. The remainder of each slug is made up of the carbon of the carbide and also separate graphite particles, compacted with the carbides and utilized as moderator for each slug.

The amount of moderator present in each fuel element will, of course, also depend upon the parameters of the reactor. In a typical fuel element for a 60 megawatt power reactor with the parameters set forth in Table I, the initial carbon-to-thorium 232 ratio as an atom basis may be, for example, about 300-to-1 and the initial carbon-to-uranium 235 ratio on the same basis may be, for example, about 1600-to-1. However, other moderator to fuel ratios could be employed, depending on the type of fuel utilized and other factors.

In calculating the amount of moderator, account is taken of the carbon of the carbide of the fuel, the particulate moderator directly dispersed and mixed with the fuel, and also the moderator which is present in each fuel element in the form of highly impermeable graphite, that is, of very low permeability, disposed as a casing or can around each slug. Account is also taken of the outer shell or tubing within the active portion of each fuel element, which tubing is fabricated from moderator, preferably the usual types of graphite. Atom-to-atom ratios will be somewhat similar in the event a uranium-235—uranium-238 fuel system is substituted for the described uranium-235—thorium-232 fuel system. The relative amounts of uranium-235—uranium-238 and moderators will, of course, also depend upon the particular operating characteristics required for the core and other factors.

In the fuel slug, the thorium-232 and uranium-235 fuel or the uranium-235 and the uranium-238 fuel, preferably present as carbides, are also preferably present, as previously indicated, in the form of particles of relatively large size, for example, 100 microns to 300 microns. It has been determined that, for example, carbide fuel particles of such size minimize the effects of recoil damage to the surrounding graphite and also minimize fission products released from the fuel slug, both of which effects are present when the carbide fuel is present in extremely small particle size, for example, when graphite moderator is impregnated with an aqueous uranium solution and subsequently brought to a high temperature to convert the uranium to carbide. Substantially homogeneous mixing of the uranium-235 and the thorium-232 or uranium-238 can be readily accomplished when the fuel constituents are in discrete particulate form. Moderator in the form of normal graphite or other suitable material, beryllium or beryllium oxide, may also be substantially uniformly mixed with the fuel.

The procedure for mixing the moderator particles with those of the fuel may be carried out in any suitable manner until the mixture is substantially homogeneous. If desired, the fuel constituents may, instead, be placed in aqueous form and may be used to impregnate the moderator subject, however, to the previously described disadvantages.

After such mixing, the resultant mixture may then be compacted and densified under suitable temperature and pressure conditions, according to conventional metal working or powder metallurgy techniques, to provide a cohesive stable fuel slug of any desired size and shape. For ease of handleability, it is preferred that each slug be relatively small. In a reactor core, such as that set forth in Table I, the fuel elements may be, for example, about 9.5 feet long and approximately 3 inches in diameter, with an active portion approximately 4.5 feet long. A plurality of fuel slugs, each of which, for example, is about 2½" in diameter and approximately 7½" long, could be readily utilized in such fuel elements. However, other sizes for the slugs are also suitable.

The fuel slugs may be conveniently formed into any desired shape, and are preferably of approximately cylindrical shape, although rectangular, cuboidal, and other shapes are also satisfactory.

The object of the compacting and densifying steps is to provide a finished stable solid fuel slug with few voids, that is, as dense as readily accomplishable. This tends to reduce the rate of passage of fission products therefrom. Moreover, the finished fuel slug or compact must be capable of withstanding temperatures of up to about 2800° F. or more in helium atmospheres over extended periods of time during operation of the reactor.

In this connection, the mixture may first be cold-pressed together to form a coherent shape. The cold-pressing can be facilitated by utilizing in the mixture of fuel and moderator a small amount of suitable binder material, for example, pitch, petroleum tar, or the like.

The cold-pressed fuel slug can then be extruded and/or cold or hot rolled to the finished shape, again under conventional metal-working conditions if desired, so as to provide the desired finished unitary structure of fine grain and good strength, stability and uniformity.

It should be noted that in the fabrication of the fuel slug there is no necessity for critically dimensioning the fuel slug so long as the slug will fit the fuel element can for which it is intended. This is the case, since the fuel slug will be incorporated into a fuel can, which may be loosely fitting around the slug, to facilitate assembly therewith.

It is to be understood that the fabricating conditions and techniques employed for the manufacture of the fuel slug are a matter of choice and will depend somewhat on the particular constituents selected for the fuel slug and their relative proportions in the slug. If desired, hot-pressing operations, followed by hot sintering operations, may be utilized instead of the described cold-pressing, extrusion and rolling operations. In addition, various impregnating and coating techniques may be utilized to further densify the fuel slugs or compacts after they are formed, thereby further retarding the diffusion of volatile fission products from the fuel bodies. The particular preferred techniques to be employed in fabricating the fuel slugs can be readily determined by those skilled in the art.

After each fuel slug has been formed and shaped in the described manner to the finished product, it may then be encased, as shown in FIGURES 1 and 2, in a loosely fitting can 57 of neutron moderating material, which, as previously indicated, has been treated so as to be as impervious as feasible to the passage therethrough of volatile radioactive fission products at the high operating temperatures contemplated for the fuel can. That is, the porosity of the canning material is greatly reduced.

The can acts as a barrier against the diffusion of volatile fission products from the fuel slug so that a considerable proportion of such fission products are retained within the can and, further, so that the rate of passage of the remainder of the volatile fission products outwardly through the walls of the can is at least substantially reduced.

Graphite is the preferred moderator material to be utilized for the canning material for the fuel slugs, since it offers a preferred combination of high temperature physical, mechanical, thermal and nuclear properties. However, the usual commercial grades of graphite are unsatisfactory per se for the purposes of the present invention, since they are, in their untreated form, relatively porous, readily permitting the passage of fission products from the fuel slug. What ever moderator canning material is utilized, the permeability thereof must be extremely low, in order that the rate of escape of volatile radioactive fission products from the fuel be low and that the amount escaping be small.

Through the use of appropriate densifying steps, of the nature of coating and/or impregnating techniques and the like, such as hot dipping, vapor plating, spraying and firing, a treated graphite can be prepared which is highly resistant to the passage of fission products therethrough, even at operating temperatures of up to 2800° F. or more over extended periods of time and in helium atmospheres.

Where coatings are applied to the graphite canning material to render it more resistant to the passage of the volatile fission products, in order to be successful for repeated use at high temperature the coatings should become integral with the base material. That is, the coatings should physically or chemically bond with the base material during or after application, so as to form an integral part thereof. Moreover, the compound so formed should not only be present at the surface of the graphite but should also permeate down through the graphite over a diffusion zone which is, perhaps, several mils thick, so that damage due to differential thermal expansion between the coating and graphite can be avoided or minimized. Silicon carbides and zirconium carbides have excellent high temperature stability and sufficiently low thermal neutron capture cross sections so that they can be readily utilized for such coatings.

Instead of the described densified relatively impermeable graphite as the canning material for the fuel slugs, silicon carbide or pyrolytic carbon may be utilized after suitable treating to make them highly resistant to the passage of fission products therethrough. Pyrolytic carbon is that carbon which can be formed by the high temperature decomposition of gaseous hydrocarbons. Other materials which can be utilized in preparing suitable moderator canning materials are beryllium, beryllium oxide, zirconium carbide and aluminum oxide after treating to decerase their permeability to volatile fission products.

Whatever the means for providing the densified or highly impermeable canning material, the material, preferably impermeable graphite, either before, during or after the densifying steps, is formed into a suitable can for the fuel slug, which can is capable of withstanding temperatures in excess of 2000° F. and which is capable of substantially retaining its low permeability characteristics at temperatures in excess of 1500° F. The forming operations may comprise, for example, conventional compacting operations under increased pressure and/or temperature, and provide a finished product in stable form. Thus, for example, graphite powder may be compacted under increased pressure and temperature into a can, after which it can be coated or impregnated to convert it to the impermeable form.

The size and shape of the can will depend upon the size and shape of the fuel slug. The thickness of the walls of the can also will vary, depending upon the strength of the particular canning material, its permeability and other factors. Generally speaking, graphite rendered highly impermeable to volatile fission products by pretreatment will be suitable for use as canning material at temperatures of up to about 2800° F., even if the can is only about ¼ inch thick. As previously indicated, the slugs and cans are preferably small, for example, less than about 1 foot long, in order to avoid complicating the fabrication of the cans and, furthermore, in order to provide the previously described advantages, including minimization of effects in the event of fracture of a can during operation of the reactor, and minimization of fission product drift within each fuel element.

The fit between the impermeable can of moderator and the fuel slug which is enclosed therein, as previously described, is preferably relatively loose in order to avoid stresses and strains due to differential expansion of the fuel slug and can at high reactor operating temperatures. Heat can be readily transferred by direct radiation, rather than by conduction, from the fuel slug through the fuel can, even when the slug is loosely disposed in the can. In this regard, since the fuel in the slug is diluted to a considerable extent with moderator and has a relatively large surface area, in contrast to heterogeneous solid fuels, the terminal efficiency is high. The loosely fitting double containment of the fuel (fuel cans plus outer shell of fuel element) is not a serious handicap to the system. Typically, for example, the gap between the fuel slugs and cans raises the fuel temperature during operation by not more than 200° F.

A lid 59, as shown in FIGURE 2 of the accompanying drawings, may be provided at one end of the fuel can 57 (or both ends, if desired) so that the slug 55 can be readily inserted into the can and then sealed therein through the use of a suitable sealing compound between the lid 59 and body 61 of the can. In this connection, the lid may be brazed onto the body of the can in such manner as to render the seal between the lid and body of the can as impermeable to fission products as the lid and body of the can. Silicon, zirconium, pitch and other materials may be utilized as constituents in the brazing compound. In the brazing process, these materials combine with the graphite and form carbides. Moreover, the brazed joint can be additionally coated and/or impregnated, if desired, with silicon, zirconium, graphite, pyrolytic carbon and/or various proprietary coatings to further fortify it against passage of fission products.

After the fuel slug is enclosed in the graphite can and the lid is securely sealed to the body of the can, at least one and preferably a plurality of the canned slugs are loosely disposed within an outer container or shell 63 of the fuel element 11, as shown in FIGURE 6, which shell preferably is of elongated tubular form.

The shell 63 of the fuel element must be capable of withstanding operating temperatures of about 1800° F. or more and may be of any suitable size and shape, depending upon the parameters of the reactor design. The shell of a typical fuel element for the reactor specified in Table I may have, for example, an average outer diameter of about 3 inches and a length of approximately 9.5 feet.

The shell is formed in accordance with any suitable fabrication method, as by compacting powder under high pressure and/or temperature. Any suitable neutron moderating material, preferably graphite, having a high neutron economy and a fairly low permeability to volatile fission products can be utilized. Preferably, the shell provides some measure of fission product retention. The thickness of the shell will vary, depending on the type of moderator utilized in forming the shell and other factors. However, with the conventional grades of graphite compacted to a rigid weight bearing form, a shell ⅛ inch to ¼ inch in thickness is usually satisfactory.

In FIGURE 6, the shell 63 is shown as being tubular and elongated, and having a pointed head 65 at one end, an expanded portion or spacer means 35 adjacent the head, and the cavity 31 centrally disposed at the squared opposite or bottom end of the fuel element. Preferably, the cavity 31 has downwardly and outwardly sloping sidewalls, as shown in FIGURES 6 and 7 of the accompanying drawings. One or both ends of the shell may be removable before sealing, so as to provide access to the interior for insertion of the canned fuel slugs.

The head 65 may be of any desired shape to facilitate insertion and withdrawal of the fuel element to and from its position in the reactor core, as by remote control means (not shown). In this connection, as shown particularly in FIGURE 6, a narrow neck or portion of reduced diameter 67 may be provided in the region of the head 65, for easy engagement with a grappling means (not shown).

The spacer means 35 may be a ring or raised or expanded portion of the shell adapted to space the main body of the fuel element a desired distance, for example, about ¹⁄₁₆ inch, from adjacent fuel elements in the reactor core, as by abutting a similar ring on each of the adjacent fuel elements or some other portion of the adjacent fuel elements. The shape and size of the spacer ring may be varied, as desired, while accomplishing these purposes. The spacer means may be integral with or connected to the shell of the fuel element. When the respective fuel elements are spaced apart in the reactor core by the respective spacer means, the passageways or interstices 25 therebetween are thereby provided for the circulation of coolant therein.

If desired, the entire top portion 27 of the fuel element 11 may be reflector material, such as graphite or the like, as indicated in FIGURE 6, so as to act as a portion of the top reflector 19 of the reactor. In such event, when the fuel element is vertically disposed in the core, the canned fuel slugs are located in the active portion of each fuel element, that is, below the top reflector portion of the fuel element. For example, in the neutronic reactor the characteristics of which are set forth in Table I, each of the fuel elements may be about 9.5 feet long. Approximately the top 2½ feet of each fuel element may be filled with graphite so as to constitute a portion of the upper reflector, while the middle 4½ feet will contain all of the canned fuel. The lower 2½ feet, that is, the lower portion 29 of the fuel element may also be filled with graphite so as to constitute a portion of the lower reflector 21. It should be understood, however, that the fuel element may, if desired, exclude either the top reflector or the bottom reflector portions, or both.

The described upper or top reflector portion of the fuel element may, of course, be integral with and include the upper portion of the shell. Alternatively, such reflector portion can be separately insertable in and/or removable from the shell. This is also the case with the bottom reflector portion of the fuel element.

The cavity 31 in the bottom portion 29 of the shell of the fuel element 11, as illustrated in FIGURE 6, is adapted to be seated in a vertical position on the cooperating vertically disposed support means 14, as shown in FIGURE 7. Moreover, provision is made for firmly seating the plurality of canned fuel slugs when the fuel element is disposed in such generally vertical position within the reactor core. The canned fuel slugs are arranged in stacked vertical relation above the lowermost canned fuel slug, as shown in FIGURE 6 of the accompanying drawings.

After the canned fuel slugs are positioned within the shell, and the reflector (if any) of the fuel element is also in place, the opening through which the slugs and reflector (if any) were introduced into the shell is sealed shut in a permanent manner, such as by brazing. The brazing can be carried out by a technique similar to that previously described in connection with sealing of the lid on the fuel can. However, the permeability to fission products need not be as low for the shell seal as for the can lid seal, so that special coating and impregnating treatments previously described for the lid seal may be obviated.

As in the case of the fuel slug and can, there is no necessity for a tight fit between the fuel cans and the shell of the fuel element. Moreover, it is advantageous to have the fuel cans loosely disposed within the shell. A space is thereby provided, from which fission products escaping the fuel cans can be removed as hereinafter described. Thermal radiation is responsible for efficient heat transfer from the fuel cans to and through the shell to the gaseous coolant flowing between the fuel elements in the reactor core, even though a considerable space may occur between the fuel cans and the shell. Radiation heat transfer is highly effective at the usual operating temperatures for the shell, that is, between about 1000° F. and about 1800° F.

Although the fuel slugs, cans and shells may be of any desired shape and size, it is preferred for ease of fabrication that they be generally cylindrical in shape with a generally circular cross section.

The fuel elements, reactor core and pressure vessel can be readily modified in size and shape as necessary or desired to meet various power requirements. In this connection, Table II below sets forth differences in certain physical and operating characteristics between a 60 megawatt power reactor of the gas cooled high temperature type and a similar but larger power reactor classified as a 400 megawatt reactor:

TABLE II

| Characteristics | 60 Mw. Power Reactor | 400 Mw. Power Reactor |
| --- | --- | --- |
| Active core dimensions. | 6 ft. diameter x 4.5 ft. height. | 15.5 ft. diameter x 11.6 ft. height. |
| Fuel-element assemblies. | 3 in. diameter; 517 fuel elements required. | 6.6 in. diameter; 713 fuel elements required. |
| Pressure-vessel dimensions. | 12 ft. diameter x 27 ft. height. | 21 ft. diameter x 40 ft. height. |
| Rating, Megawatt-heat/kg. U²³⁵. | 0.92 | 1.0. |
| Core life (at 80% load factor). | 1.2 years | 3.4 years. |
| Over-all plant thermal efficiency. | 36% | 37%. |

It is apparent from the foregoing Table II that the fuel elements of the present invention can be effecitvely utilized in various power level neutronic reactors with appropriate modifications in size and shape.

The fuel element of the present invention preferably includes a fission product retention system to assure that the coolant in the primary circuit remains substantially free of those volatile fission products which may pass through the fuel cans.

The fission product trap system is an extension of the fuel element proper and comprises one or more fission product traps, preferably located in a relatively cool part of the system. These traps are preferably connected to the fuel element proper through the space between the fuel cans and the shell in each fuel element by means of suitable passageways through the fuel element. FIGURE 6 illustrates a preferred form of the fission product trap system, wherein a chemical or hot trap 68 is located within the lower reflector portion of fuel element 11. In this connection, the bottom reflector portion is hollowed out to provide a recess 66 for receiving the chemical trap materials. The recess 66 is connected to the space between the fuel cans and shell by a passageway 69. The lower end of the recess is provided with an outlet passageway 71 which extends from the recess 66 to the centering and supporting cavity 31. As will be hereinafter described, the cavity 31 is connected to a series of physical traps (cool trap 70 and cold trap 72) to complete the removal of fission products. The location of the chemical traps in the lower reflector section places these traps in the heated section of the reflector but in a location which is at a temperature somewhat below the maximum temperature of the fuel elements themselves. The physical traps are located in a cool section outside the fuel element proper and preferably outside the reactor vessel, as shown in FIGURE 3.

Alternatively, the fission product trap system may be wholly disposed outside the fuel element proper, as illustrated in FIGURE 1 of the accompanying drawings. In FIGURE 1, a fuel element 11a is illustrated which fuel element is substantially identical in most respects to fuel element 11 of FIGURE 6. Accordingly, the components of the fuel element 11a which are substantially identical to those previously described for the fuel element 11 are identified by the same numerals succeeded by the letter a.

Referring particularly to FIGURE 1, it will be noted that no trap is disposed within the fuel element proper. The chemical and physical traps are preferably located outside of the reactor pressure vessel and are connected with the fuel cans 57a of the fuel element 11a by means of a passageway 75 in communication with a passageway 77 in the bottom portion 29a of the fuel element proper between the cavity 31a and the space between the fuel cans 57a and the shell or tube 63a.

It has been found that for most purposes the fission product trap system as set forth in FIGURE 6 is prefered. In this connection, substantially the greater part of the high activity volatile fission products from the fuel slugs can be trapped or removed by the hot or chemical trap. If each trap is removable and replaceable with the fuel element by being an integral part thereof, the accumulation of fission products in the fission product trap system can be greatly restricted. The chemical or hot trap, if properly designed, is capable of removing approximately 95 percent of the chemically active fission products passing from the fuel slugs. Accordingly, the heat production and radioactivity which must be handled by the fixed traps of the system, such as subsequent physical traps, can be greatly reduced. Furthermore, if a chemical trap is located within the body of the fuel element, as shown in FIGURE 6, in the event that a fuel slug ruptures, the sudden increase in radioactivity can be more readily controlled, and the fission materials can be removed before they enter and affect the fixed components of the trapping system, that is, before they are passed from the fuel element.

The fission product trap system is connected with an area of reduced pressure as compared to the pressure in the reactor such as the outlet side of the coolant primary circuit. Thus, volatile fission products will not pass outwardly through the sheel of the fuel element but, instead, the coolant gas will flow inwardly through any leaks or pores in the shell from the higher pressure area outside of the shell and thence into the trap system. The coolant flowing inwardly through the shell tends to sweep the shell of fission products and carry them toward the low pressure area where the entrained fission products are removed by the trapping system. This construction minimizes fission product contamination of the coolant in the primary circuit.

As previously indicated, the trap system, in general, may comprise two types of traps. One type of trap is the chemical trap which is capable of removing or retaining both volatile non-metals or near non-metals, such as iodine, tellurium and antimony, and also volatile metals, such as cesium, barium and strontium, by reaction therewith. These metals and non-metals may be present in volatilized radioactive form in the coolant, as fission products from the fuel slugs. Physical traps may also be provided in series with the chemical trap or traps. These physical traps are preferably cold traps which act to change the physical state of the volatile fission products and, thereby, remove the same from the coolant passing therethrough.

It is unlikely that any single trap will be completely effective for the removal of all hot volatile fission products passing from the fuel cans. However, the combination of chemical and physical traps, as specified, effectively controls the concentration of such materials in the coolant in the primary circuit.

The trap system can effectively operate, utilizing a single chemical trap, followed in series by a cool trap and a final or cold trap. Additional chemical and/or physical traps may be added to the system, as desired.

The primary duty of the chemical trap is to remove the bulk of the heat-producing volatile radioactive fission products present in the coolant passing from the fuel element proper. Accordingly, it is preferred that at least one chemical trap be operated as the first or primary trap. The cool physical trap provides further simple and inexpensive attenuation of the fission products. By lowering the temperature gradually, through the use of the cool trap as an intermediate stage, it is relatively easy to provide the necessary refrigeration for the final trap, which may be a cold trap adapted to eliminate substantially all remnants of volatile fission products by liquefying the same at very low temperature. Such a trap retains krypton and xenon which, since they are essentially chemically unreactive, are not retained by the chemical trap. This cold trap may be operated, for example, at about the temperature of liquid nitrogen, that is (about $-320°$ F.), and preferably with activated charcoal present as an adsorbing agent.

In each instance, whether the trap is chemical or physical, its primary mode of operation is to convert the volatile fission products in the coolant passing therethrough to a less volatile form, whereby they will have a vapor pressure which is much lower than their partial pressure in the coolant gas, such as helium at between about 10 and about 15 atmospheres pressure. It has been calculated that utilizing a 60 megawatt reactor having the characteristics as set forth in Table I, the partial pressures of the volatile fission products may be up to about $10^{-4}$ atmospheres. Accordingly, in the chemical trap, reagents must react with fission products to yield solids, solid solutions, liquids or chemisorbed forms, having much lower vapor pressures than $10^{-4}$ atmospheres at the trap temperature. Such operating temperatures are approximately 665° F. to 1340° F.

Strontium, antimony, tellurium, iodine, cesium and barium are among the most volatile of the fission products present in the coolant. Fission products of the following elements show little void space diffusion in fuel elements and little tendency to vaporize therefrom because of their low volatilities:

Zirconium
Niobium
Molybdenum
Technitium
Ruthenium
Rhodium
Palladium

Yttrium and the rare earth metals are believed to form stable carbides. Most of such elements are to be considered substantially non-volatile and, therefore, will not diffuse from the fuel slugs during operation of the reactor, at least not to a considerable extent. However, it appears that the fission products of samarium and europium may tend to show significant void space diffusion and vaporization from graphite fuel shells, even though they form relatively stable carbides.

The fission product elements germanium, gallium, silver and tin might be classed as being of intermediate volatility. The vapor pressure of these elements (as the monatomic gas over the metal) is less than $10^{-8}$ atmospheres at about 1340° F. Accordingly, these latter elements will tend (under reducing conditions) to come out on a trap at temperatures of around 1340° F. or less. The element indium is also relatively non-volatile and can be readily condensed on a trap at approximately 800° F. The following radioactive elements, although volatile, are relatively unimportant as reactor contaminants because of their low fission yields and/or very short half lives:

Zinc
Arsenic
Selenium
Bromine
Rubidium
Cadmium

For a chemical trap to operate efficiently within the described temperature range and react with the volatile fission products to yield compounds which have much lower vapor pressures than $10^{-4}$ atmospheres, it has been found that two types of reagents are usually required.

One type of reagent is that which will provide a highly electropositive metal that will not melt or appreciably vaporize at the operating temperatures and which will form stable, relatively non-volatile compounds with the volatile non-metallic radioactive fission products (such as isotopes of iodine, antimony and tellurium) it is desired to remove from the coolant.

The second type of reagent is one which will furnish a highly electronegative element which will form stable, relatively non-volatile compounds with volatile metallic radioactive fission products (such as isotopes of cesium, strontium and barium).

Among the highly electropositive metals which appear to be most satisfactory for use as the first type of reagent in the chemical trap are the elements yttrium and lanthanum for higher trap temperatures of about 1340° F. and over, and the elements calcium, strontium and barium for lower trap temperatures of approximately 665° F. to 800° F. Strontium may be utilized even though it is appreciably volatile at 800° F., since a maximum loss of only about 1.7 milligrams of strontium per year will occur due to the sweeping action of helium (on the basis of a helium flow rate in the reactor system of 0.1 cubic centimeter per second).

From a consideration of the products formed with the electropositive reagent and the desirable operating temperatures, barium has been found to be a preferred reagent, with yttrium also somewhat preferred. Trap temperatures substantially lower than 1340° F. are preferred because of the relatively high vapor pressures of compounds of iodine and the electropositive reagents.

Regarding those reagents which will provide a highly electronegative element for forming stable, relatively non-volatile compounds with metallic radioactive fission products, such reagents may supply oxygen, fluorine or chlorine, as the electronegative element, preferably oxygen or fluorine, since chlorine has a relatively high thermal neutron absorption cross section. Oxygen and fluorine are particularly effective for trapping strontium, barium, yttrium and rare earth fission products, due to the high relative stability and low relative volatility of their oxides and fluorides.

Such reagents should also be effective in removing radioactive cesium from the fission product metals in the system. However, cesium is extremely difficult to trap. Rubidium sesquioxide, ferric fluoride and ceric fluoride can be utilized to advantage. Also rubidium fluoride and cesium fluoride can be utilized as holdback agents.

Since the strongly electropositive and strongly electronegative reagents would react together, the chemical trap should be divided into separate sections, allowing for the treatment of the coolant gas by first one type of reagent, then the other.

With the above-described types of reagents suggested for the chemical trap, very little reagent will be lost by vaporization during the course of one year's operation of the reactor. Accordingly, the described chemical traps can be effectively operated for extended periods of time.

Such effective operation may be impaired in the event that hydrogen or another reactive gas is present to any significant degree in the helium coolant in the reactor system. In the case of chlorine- or fluorine-yielding reagents, the hydrogen will tend to react therewith so as to deplete them and to form corrosive compounds adversely affecting the reactor system. Strongly electropositive reagents, preferentially, react with the hydrogen to remove this danger. However, such reagents are, of course, depleted by the reaction. Accordingly, care should be taken to keep the coolant as free as possible of reactive gases.

A chemical trap, as previously indicated may be located within the body of each fuel element or may be an extension thereof, that is, connected thereto by means of a conduit or the like.

FIGURE 6 of the accompanying drawings illustrates an arrangement whereby the chemical trap 68 is wholly disposed within the bottom reflector portion of the body of the fuel element 11. The chemical trap 68 is divided into two sections, 79 and 81, in order to provide the desired separation of the electropositive and electronegative reagents. A generally similar arrangement is shown in FIGURE 1, in which the chemical trap 68a, although disposed outside of the fuel element 11a, is divided into sections 79a and 81a (shown in dotted outline). Both sections are adapted to communicate, as previously described, with the space between the fuel can and the shell of the fuel element. In this connection, the fission products are conveyed by the coolant through passageway 69 in the fuel element of FIGURE 6 to the chemical trap, and by passageways 77 and 75, illustrated in FIGURE 1, to the chemical trap.

Krypton and xenon, which are chemically unreactive, and certain other volatile fission products are not trapped by chemical traps. Such products may pass, as by suitable conduits, including 71 and 73 in FIGURE 6 and 83 in FIGURE 1, to a cool trap (designated 70 and 70a in FIGURES 6 and 1, respectively) located in series with the respective chemical traps.

One or more radiation monitors may be interposed in the fission products trap system as shown in FIGURES 3, 6 and 7, preferably before any of the traps or subsequent to the chemical trap but prior to the physical traps, as shown in FIGURE 3 and as set forth in greater detail hereinafter.

The cool trap is preferably located in a cool portion of the reactor system, such as outside the thermal shield and may operate, for example, at an average temperature of between about 650° F. and about 150° F. The cool trap acts to remove and attenuate a further proportion of the fission products from the coolant gas passing therethrough, by cooling the same to liquid or solid form.

Such coolant gas may, thereafter, pass, as by a conduit (designated 85 and 85a in FIGURES 6 and 1, respectively) to a final trap, that is, a cold trap (designated 72 and 72a in FIGURES 6 and 1, respectively), preferably operating at a very low temperature, for example, at about the temperature of liquid nitrogen approximately −320° F. in the presence of an adsorber, preferably activated charcoal. In the cold trap, substantially all of the remnants of the removable fission products are trapped, as by precipitation, as liquids or solids on the adsorber. For example, krypton and xenon are trapped in substantial amounts. The coolant gas, thus purified, may thereafter pass, for the previously described reasons, to the zone of lower pressure. Preferably, this zone has a pressure at least about 3 p.s.i.g. lower than that of the zone in which the fuel elements are disposed.

It should be understood that the fission product trap system may include more than one chemical trap and/or physical trap other than those specified, for example, a gaseous diffusion cascade system. Moreover, the trap system can be utilized to advantage with other fuel elements for neutronic reactors than those specified herein in order to remove fission products from the reactor system. For example, the trap system is applicable to other types of fuel elements providing a space between the fuel and outer jacket of the fuel element into which fission products may pass and from which such products can be removed. The present invention extends to other similar uses for such a trap system.

If desired, a proportion of the coolant gas can also be vented to a separate purification system for continuous cleanup, to minimize the distribution of fission products in the primary coolant circuit. The purification system may comprise a suitable trap or traps, such as the described chemical trap, cool trap and cold traps, which act to purify the coolant in the described manner after, if desired, such coolant is passed through a particle separator.

The particle separator may be of any conventional design, such as an electrostatic precipitator, and is especially useful in the initial cleanup of the coolant before full operation of the reactor. In this connection, the primary coolant circuit is likely to initially contain considerable quantities of graphite dust from the reflector and moderator, such dust being deposited during construction of the reactor. This dust can be readily picked up by the particle separator.

The reactor system also includes a radiation monitor or detection system, so that the radiation level within the reactor core can be continuously or periodically determined. It is preferred that the radiation monitoring system be arranged so as to be capable of rapidly locating the source of unusual radiation activity. For example, if one or more fuel cans rupture so that an increase in the diffusion of radioactive materials from one or more fuel elements occurs, with a consequent increase in the radiation level, it is highly advantageous to be able to rapdily determine which fuel element or fuel elements contain the ruptured fuel cans. Upon such determination, the fuel elements involved can be effectively dealt with, as for example, replacing them with undamaged fuel elements.

A radiation monitoring system particularly suitable for such purposes is a matrix type, such as is illustrated diagrammatically in FIGURE 5 of the accompanying drawings. In this type of monitoring system, the fuel elements are interconnected in groups and each group is connected to a single monitor. Each fuel element is connected to form a part of two groups of fuel elements and is consequently connected to two monitors. In the event that two monitors show abnormal radioactivity, the offending fuel element can be readily located. For the purpose of illustration, FIGURE 5 shows a group of fuel elements arrayed in parallel groups. In this diagrammatic representation, two sets of parallel rows of conduits are provided, one set of conduits 87 extending in one direction and the remaining set of conduits 89 extending in a transverse direction, so that the conduits in the two sets intersect to form a grid pattern as illustrated. Each set of conduits is connected to a separate monitor, as shown in FIGURE 5, set 87 being connected to monitor 91, and set 89 to monitor 93. The space between the fuel cans in each fuel element is separately connected to one conduit from each set as shown in FIGURE 5, none of the conduits of the monitoring system interconnecting with each other. Each conduit is connected in series to a plurality of fuel elements.

In operation, the monitors 91 and 93 continuously or periodically measure the radiation in the coolant flowing from the space between the fuel cans in each fuel element and up through the conduits and past the monitors. The monitors may be, for example, any suitable radiation measuring device, for example, gaseous fission product monitors, utilizing beta-sensitive halogen-quenched detectors or the like. In order to locate the particular fuel element involved, the various conduits leading into both monitors are checked or scanned and the conduits exhibiting the radiation fluctuations are noted. In the event of a fluctuation in the radiation level due, for example, to one fuel element, such fluctuation will register on both monitors. Since two conduits only intersect at or are connecetd to one common fuel element, the offending fuel element is readily identifiable.

FIGURE 7 of the accompanying drawings illustrates preferred means for interconnecting the fuel elements of the present invention with the radiation monitoring system, as well as means for supporting the lower ends of the fuel elements in the desired position in the reactor core. As illustrated, each fuel element is supported upon the horizontal base plate 37, which plate is provided with a grid of conduits, two conduits intersecting under each of the fuel elements. Each of the conduits interconnects with a number of the fuel elements and each conduits is monitored during operation, as previously described.

The conduits may be formed in the base plate by various means. For example, the conduits may be cast in the base plate or the base plate may be fabricated in layers, with the conduits being milled in the respective layers. Various other means of fabrication of the conduits will be readily apparent to one skilled in the art.

Preferably, the intersecting conduits are at different levels in the base plate, as shown in FIGURE 7. The lower conduit is illustrated in FIGURE 7 as conduit 89 and the upper transverse conduits are illustrated as conduits 87. This arrangement is also shown in plan view in FIGURE 9. In order to provide a support for the fuel elements and in order to provide access to the channels, a vertically extending hole 94 is provided in the horizontal plate 37, which hole intersects the two conduits 87 and 89. The vertically extending support plug 14 has at its lower end a portion 95 of reduced diameter, which portion is adapted to fit into the hole 94 in the base plate 37. The weight of the fuel element 11 is supported by a shoulder 97 intermediate the portion 95 of reduced diameter and the supporting plug proper 99. The support plug 14 is provided with a vertically extending central passageway or channel 101 which is adapted to connect the cavity 31 in the bottom of the fuel element with the radiation monitoring system, as hereinafter described.

The upper end of the support plug 14 is provided with the head 33 which, of course, is formed so as to provide an essentially gas tight seal with the cavity 31 in the bottom portion of the fuel element so that the leakage of gas is minimized, gas passing from the fuel element directly into the channel 101 in the support plug. The head is preferably rounded or conical shape, as illustrated, so that it aids in centering the bottom end of the fuel element 11 on the support plug 14.

Connection with the monitoring system is desirably made in such manner that there is a substantially vertical downward flow of gas from the fuel element to the conduits 87 and 89. This construction is desirable so that volatilized entrained radioactive fission products present in the gaseous coolant flowing from the fuel element and into one of the conduits 87 or 89 will not readily be transferred into the other conduit in communication with the fuel element, as under abnormal pressure conditions.

Such an event would interfere with accurate determination of the radiation levels of the respective fuel elements.

In the desired construction illustrated in FIGURE 7, an enlarged portion 103 is provided in the lower end of the channel 101. Connection between the channel 101 and the conduit 89 in the base plate, that is, the lower conduit, is accomplished by providing suitable outlet holes 105 in the walls of the plug 14 opposite the conduit 89 in the base plate.

In the base of the portion of enlarged diameter 103 in the channel 101 there is provided a sealing insert 107 which carries at its upper end a hollow vertically extending spindle 109 having a centrally disposed passageway 111 extending vertically therethrough, which is adapted to conduct the coolant gas from the portion 103 into the passageway 87. The insert and its spindle portion are illustrated particularly in FIGURE 8.

As shown in that figure, the insert is cylindrical in shape and is adapted to seal the bottom of the enlarged portion 103 of the passageway 101. The spindle section 109 of the insert has its upper end spaced a substantial distance from the connection to the channel 89 in the base plate. The connection to the channel 87 is provided by a boss 113 on the lower portion of the spindle, within which boss is horizontally disposed a passageway 115 communicating with the lower end of the passageway 111 and also communicating with the conduit 87. The boss 113 is adapted to seal off the passageway 115 from access to the portion 103 of the passageway or channel 101 adjacent the bottom of portion 103 and in the region of the conduit 87. The horizontally disposed passageway 115 is in register adjacent its ends with suitable openings in the walls of the reduced portion 95 of the plug 14, which openings are also in register with the conduit 87 leading to the monitor 91.

In the construction which has been described, the coolant gas passing from the fuel element and into the channel 101 passes downwardly and is divided, a portion of it passing into the passageway 111 of the spindle 109 and the other portion of it passing between the outer wall of the spindle 109 and the inner wall of the reduced portion 95 of the plug 14. The portion which passes into the spindle passageway flows downwardly into the channel 87, and the other portion flows downwardly and into the channel 89. There is little chance of mixing of the fission products in the respective coolant streams. As will be apparent from an examination of the drawings, coolant gas flow in the channel 89 is not restricted by the presence of the insert, since the coolant in that channel readily flows around the wall of the spindle 109 and out the outlet on the opposite side of the wall. Coolant gas flowing through the channel 87 readily flows through the horizontal passageway 115 in the boss 113 on the spindle 109 without restriction.

A particular feature of the matrix system utilized in connection with the present fuel elements is that a pressure drop from each fuel element to the monitors is provided so that the flow of fission products is unidirectional, that is, from the fuel elements, through the associated conduits and to the monitors. In this connection, a slightly higher pressure is maintained in the passageways surrounding the fuel elements than in the conduits from the fuel elements to the monitors. This is readily accomplished by interconnecting the monitors to a zone of slightly lower pressure such as the outlet side of the coolant circuit. For this purpose, the monitors are preferably connected to the upstream side of the physical traps, that is, the cool and cold traps, as shown in FIGURES 6 and 3, which traps in turn are connected, as by a return line, to the primary circuit at a point outside the pressure vessel.

There is a tendency in such a system, employing a line pressure drop by interconnection with a zone of decreased pressure, to exhibit a decreasing pressure, that is, a greater pressure drop, with decreasing distance from the point of interconnection with the low pressure zone. This pressure gradient affects the flow rate of coolant from fuel elements connected into the system at various points along the pressure gradient to the monitors. The flow rates of coolant from the respective fuel elements can be readily substantially equalized merely by varying the length and/or diameter of the openings of the support plugs 14, that is, the frictional flow resistance, or by other equivalent means. A typical arrangement is shown in FIGURE 3 of the drawings, wherein plug length is varied from fuel element to fuel element, the representation being exaggerated for purposes of illustration.

In practice, a maximum variation in the length of the plugs of only about 3 or 4 inches may be sufficient to provide the desired results for a reactor core having the parameters specified in Table I. It will be noted that the shorter support plugs (offering least frictional resistance to coolant flow) are at the beginning of the conduit flow paths from the fuel elements to the monitors, that is, at the greatest distance from the monitors or where the pressure in the conduits is higher and the pressure drop between the fuel element and conduit is less. As the fuel element distance from the monitors decreases, the pressure in the associated conduit decreases, and the pressure drop between the fuel element and conduit is greater, tending to increase the coolant flow rate. Accordingly, the length of the associated support plugs is greater so as to offset greater frictional resistance to coolant flow and thereby provide a coolant flow rate substantially the same as in other parts of the reactor core. A steady, substantially uniform coolant flow rate from the respective fuel elements of the reactor core is important as a factor in maintaining substantially uniform operating conditions for the reactor core and in assuring accurate radiation monitoring.

In addition to the fission product trap system and the radiation monitoring system, suitable shielding in the form of the described reflectors nad plenum around the reactor core and suitable secondary containment, that is, a pressurized vessel around the entire reactor plant are also provided to assure the operation of the reactor system at a safe radiation level for personnel.

Accordingly, the solid fuel element of the present invention, as a result of its unique construction, is both novel and highly advantageous. It is provided with an integrated fission product trap system and radiation monitoring system, which, together with its other structural features, enable its efficient and safe operation at high temperature levels. The use of the plurality of small moderator fuel cans in each fuel element enables high temperature operation and assures less radiation in the event of a fuel can rupture. It also minimizes fission product drift within the fuel elements, rendering them more stable.

Since the fuel element utilizes an enriched fuel, the reactor core can be kept relatively small. Such fuel element provides a high power density, for example, about 16 kw./liter for a five foot diameter core of equal height when a typically enriched fuel is utilized, so that the core is economical to construct and operate. The core can be adequately cooled with highly satisfactory heat transfer when the gas coolant, preferably helium, is utilized at a pressure of only about 10 to 15 atmospheres. Accordingly, the reactor construction can be less critical or stringent than is necessary with higher pressure reactors.

Since the fuel element of the present invention is capable of operating at temperatures well in excess of 1000° F., for example, 1400° F. to 2200° F. or more, heat transfer from the fuel element to the surrounding cooling gas can be carried out in a highly improved manner, largely by direct radiation rather than by conduction as in conventional reactors. Such high temperature operation allows the fuel element to be economically constructed with greater dimensional tolerances for its components than found in conventional gas cooled reactors. Even though the components of the fuel element of the present invention are loosely assembled, radiation at the high operating temperatures rapidly and efficiently transfers heat from the fuel slugs or compacts to the area outside the outer tube wherein the gaseous coolant circulates. Such efficiency is considerably higher than that achieved with conventional reactors relying on conduction for heat transfer.

It will be readily understood that it is of definite advantage to be able to construct an operable and efficient fuel element without having to critically dimension its components before assembly. This is particularly true when the fuel element is designed to operate at greatly increased temperatures, since at such temperatures, increased differential expansion of components will be encountered. Such expansion will be liable to introduce undesired stresses and strains in those fuel element components which are tightly joined together. Fuel element components loosely assembled together are capable of withstanding greater differential expansion without production of deleterious stresses and strains.

A further advantage of operating at high temperatures with the fuel element of the present invention is that Wigner stored energy effect and growth problems in graphite can be avoided. Such problems are overcome since at the usual operating temperatures contemplated for the fuel elements of the present invention, the radiation effects of the fuel on the graphite are continually annealed. Other advantages of the present invention are as set forth in the foregoing.

It will be appreciated that such modifications in the components of the fuel element of the present invention, in their combination and in their methods of fabrication as are within the skill of those versed in the art are contemplated as being within the scope of the present invention.

We claim:

1. A fuel element for a neutronic reactor comprising an exterior elongated shell constructed of solid neutron moderating material and provided with means for mounting and spacing said element within said reactor, at least one compacted fuel slug of fissionable material dispersed in a neutron moderator disposed in said shell, and a sealed can enclosing said slug, said can being formed of a neutron moderator material having a lower permeability to fission products than the material of said shell with the inner surfaces of said can being generally spaced from said slug and with the exterior surfaces thereof being generally spaced from the inner surfaces of said shell, thereby providing an annular space extending along the length of said can wherefrom fission products may be swept by coolant gas diffusing through said shell.

2. A fuel element as described in claim 1 wherein said can is formed of a material selected from the group consisting of graphite, silicon carbide, beryllium, beryllium oxide, zirconium carbide, aluminum oxide pyrolytic carbon and mixtures thereof.

3. A fuel element as described in claim 1 wherein said fuel slug is fabricated of a compacted mixture of uranium 235 carbide, a carbide of a breeder material selected from the group consisting of thorium 232 and uranium 238, and graphite as a moderator.

4. A fuel element for a neutronic reactor comprising an elongated cylindrical shell constructed of a solid neutron moderator and being provided with exterior spacer projections and terminally with mounting means, a plurality of cylindrical fuel slug compacts formed of a fissionable material and a moderator disposed centrally along the axis of said shell, a sealed can formed of a moderating material having a fission product permeability below that of the material of said shell enclosing each of said slugs with the inner surfaces thereof being generally spaced from the surfaces of said fuel slug and with the outer surfaces being inwardly disposed from the inner surfaces of said shell to provide an annular space extending along the length of said cans, and a moderator reflector filler disposed in one end of said shell said filler having a conduit passage formed therein communicating with the aforesaid annular space for coupling to trap means for removing fission products from said annular space.

5. The fuel element as described in claim 4 wherein said trap means includes cavities formed in said reflector filler and communicating with said conduit, said cavities containing respectively non-volatile electropositive metal selected from the group consisting of yttrium, lanthanum, calcium, strontium and barium and a non-volatile reagent containing an available electronegative material selected from the group consisting of oxygen, fluorine and chlorine capable of reacting with fission products entering through said conduit.

6. A fuel element for a high temperature gas cooled neutronic reactor comprising an elongated cylindrical shell of solid neutron moderating material provided with exterior spacer projections and being adapted terminally for engagement with fuel element support means of said reactor, a plurality of cylindrical fuel slug compacts of a particulate fissionable material dispersed in a neutron moderator and disposed centrally along the axis of said shell, a sealed cylindrical can formed of a material selected from the group consisting of graphite, silicon carbide, beryllium, beryllium oxide, zirconium carbide, aluminum oxide, pyrolytic carbon and mixtures thereof having a permeability to fission products lower than that of said shell enclosing each of said slugs with the inner surfaces of said can being generally spaced from said slug and with the outer surfaces of said can being spaced from said shell providing an annular space therebetween extending along the length of said fuel cans, and a moderator reflector filler disposed in the lower end of said shell and having a conduit passage therein coupling said annular space with a conduit passage provided in said support means, whereby fission products diffusing outwardly from the fuel slugs through said cans are swept from said annular space by gas diffusing inwardly through said shell by application of reduced pressure to said support conduit passage.

7. A fuel element for a high temperature gas cooled neutronic reactor comprising an elongated cylindrical shell constructed of graphite provided exteriorly with spacer projections and terminally with means to engage support means of said reactor with the lower end of said shell being adapted to fit within cooler reflector regions of the reactor, a plurality of cylindrical fuel slug compacts formed of particulate carbides of fissionable material selected from the group consisting of thorium 232 and uranium 235 dispersed in graphite moderator and disposed along the axis of said shell, sealed cylindrical cans formed of graphite having a lower permeability to the passage of fission products than that of said shell enclosing said slugs with the inner surfaces being generally spaced from said slugs and the outer surfaces being spaced from said shell to provide an annular space extending the length of said cans, a moderator reflector filler disposed in the lower cooler portion of said shell and provided with a conduit communicating said annular space with an orifice in the lower of said support means for coupling to an evacuation conduit system communicating with evacuating means disposed exteriorly of said reactor, said filler having also provided therein cavities traversed by the aforesaid conduit with said cavities containing at least one non-volatile electropositive metal selected from the group consisting of yttrium, lanthanum, calcium, strontium and barium and one non-volatile reagent containing an available electronegative material selected from the group consisting of oxygen, fluorine and oxygen capable of reacting with fission products separately consisting a chemical trap for fission products swept from said annular space by coolant gas diffusing through said shell.

8. In combination in a high temperature gas cooled neutronic reactor a fuel element comprising an elongated cylindrical shell formed of solid neutron moderating material disposed within said reactor with the upper end retained within the upper reflector portion of said reactor and the lower end disposed within the lower reflector of said reactor, said shell being provided in upper regions with spacer projections and at the lower end with support and conduit coupling means, a plurality of compacted fuel slugs of fissionable material dispersed in a moderator disposed within said shell, and a sealed can enclosing each of said slugs said can being formed of a neutron moderator having a lower permeability to fission products than that of said shell with the interior surfaces of said can being generally spaced from said slug and with the exterior surface being separated from said shell to provide an annular space extending along said cans within said shell, a moderator reflector filler within the upper portion of said shell, and a moderator reflector filler disposed within the lower portion of said shell and being provided with a conduit passage connecting said annular space with said conduit coupling means; a conduit system coupled to the conduit coupling means of said fuel element and leading exteriorly to a zone of lower pressure; a monitoring system coupled to said conduit system; and a fission product trap traversed by said conduit system and connected between said monitoring system coupling and said zone of lower pressure, whereby fission products emerging from said fuel cans are swept successively through said annular space, reflector filler conduit, monitoring system, and into said trap by coolant gas diffusing through said shell.

9. The combination as described in claim 8 wherein said conduit system comprises a matrix system with individual conduits intersecting the flow of gas from said fuel element, and said monitoring system includes radiation monitors coupled to each of said individual conduits.

10. The combination described in claim 8 wherein a plurality of traps is employed as said fission product trap, said traps including chemical and physical fission product traps.

References Cited in the file of this patent

UNITED STATES PATENTS

| | | |
|---|---|---|
| 2,777,812 | Powell | Jan. 15, 1957 |
| 2,782,158 | Wheeler | Feb. 19, 1957 |
| 2,798,848 | Kingdon | July 9, 1957 |
| 2,799,642 | Hurwitz et al. | July 16, 1957 |
| 2,810,689 | Wigner et al. | Oct. 22, 1957 |
| 2,813,070 | Fermi et al. | Nov. 12, 1957 |
| 2,814,857 | Duckworth | Dec. 3, 1957 |
| 2,816,042 | Hamilton | Dec. 10, 1957 |
| 2,818,605 | Miller | Jan. 7, 1958 |
| 2,831,807 | McGarry | Apr. 22, 1958 |
| 2,838,452 | West et al. | June 10, 1958 |
| 2,851,409 | Moore | Sept. 9, 1958 |
| 2,907,705 | Blainey | Oct. 6, 1959 |

FOREIGN PATENTS

| | | |
|---|---|---|
| 752,152 | Great Britain | July 4, 1956 |

OTHER REFERENCES

Nucleonics, March 1956, pp. 34–41.